United States Patent [19]

Bauer et al.

[11] Patent Number: 5,797,619

[45] Date of Patent: Aug. 25, 1998

[54] AUTOMOTIVE TRIM PIECE AND METHOD TO FORM AN AIR BAG OPENING

[75] Inventors: David J. Bauer, deceased, late of West Bloomfield; John W. Bauer, Jr., executor, Allen Park, both of Mich.

[73] Assignee: Tip Engineering Group, Inc., Farmington Hills, Mich.

[21] Appl. No.: 851,413

[22] Filed: May 5, 1997

Related U.S. Application Data

[60] Continuation of Ser. No. 511,327, Aug. 4, 1995, which is a division of Ser. No. 391,336, Feb. 21, 1995, abandoned, which is a division of Ser. No. 934,886, Aug. 24, 1992, Pat. No. 5,217,244, which is a continuation of Ser. No. 471,922, Jan. 23, 1990, abandoned, which is a continuation-in-part of Ser. No. 380,156, Jul. 14, 1989, abandoned, which is a continuation-in-part of Ser. No. 303,132, Jan. 30, 1989, Pat. No. 5,080,393.

[51] Int. Cl.$^6$ ............................................. B60R 21/20
[52] U.S. Cl. .......................... 280/728.3; 83/875; 280/732
[58] Field of Search .......................... 280/728.3, 728.1, 280/732; 102/275.1, 275.8, 202.7; 83/875; 264/293

[56] References Cited

U.S. PATENT DOCUMENTS

| Re. 11,365 | 9/1893 | Saltzkorn et al. ............... 83/875 |
| 3,632,136 | 1/1972 | Foltz . |
| 3,640,546 | 2/1972 | Brawn . |
| 3,756,617 | 9/1973 | Brawn . |
| 4,120,516 | 10/1978 | Takamatsu et al. ............ 280/728.3 |
| 4,380,564 | 4/1983 | Cancio et al. ................... 264/293 |
| 4,893,833 | 1/1990 | DiSalvo et al. ................. 280/728.3 |
| 5,080,393 | 1/1992 | Dixon, Jr. et al. . |

FOREIGN PATENT DOCUMENTS

| 3116-538 | 4/1981 | Germany . |
| 3315535 | 3/1984 | Germany ................ 280/732 |
| 3545028 | 7/1987 | Germany ................ 280/728.3 |
| 51-25342 | 8/1974 | Japan ........................ 280/728.3 |
| 62-279687 | 5/1989 | Japan . |

*Primary Examiner*—Eric D. Culbreth
*Attorney, Agent, or Firm*—John R. Benefiel

[57] ABSTRACT

An arrangement for forming an opening in an auto interior trim panel or piece normally having no visible indication of the opening just prior to inflation of an inflatable air bag, allowing deployment of the air bag into the passenger compartment of vehicle, the arrangement including a linear element positioned below the skin of the trim panel or wheel cover in a pattern corresponding to the opening. In a first embodiment a heat generating element is employed as the linear element which when activated degrades the covering skin layer of the trim piece in pattern shape. In a second embodiment detonating cord enclosed in a metal tube is employed with a series of holes directing the energy of detonation to sever the panel skin material. In a third embodiment a split sleeve having explosive coating on the inside is used to create a flame front severing the panel skin in the appropriate pattern. The skin may be mechanically preweakened prior to assembly by a precision cutting operation performed on the inside surface, in a pattern matching with the pattern of the linear element, aiding the process of forming the opening in the trim piece at the instant of deployment.

8 Claims, 3 Drawing Sheets

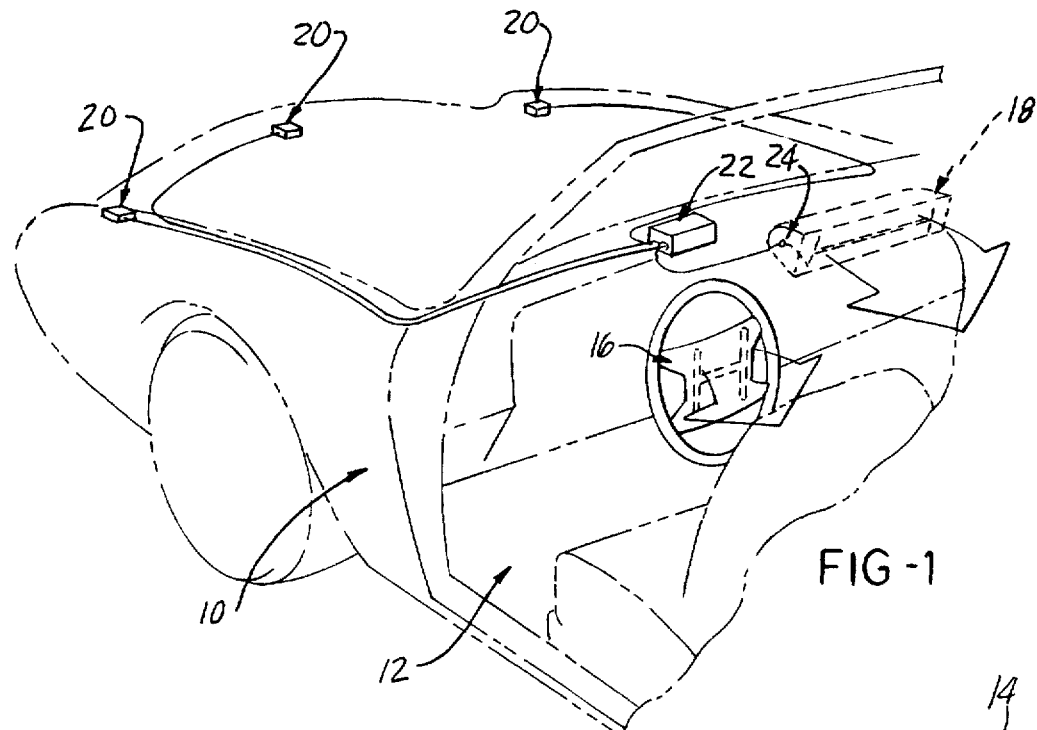
FIG-1
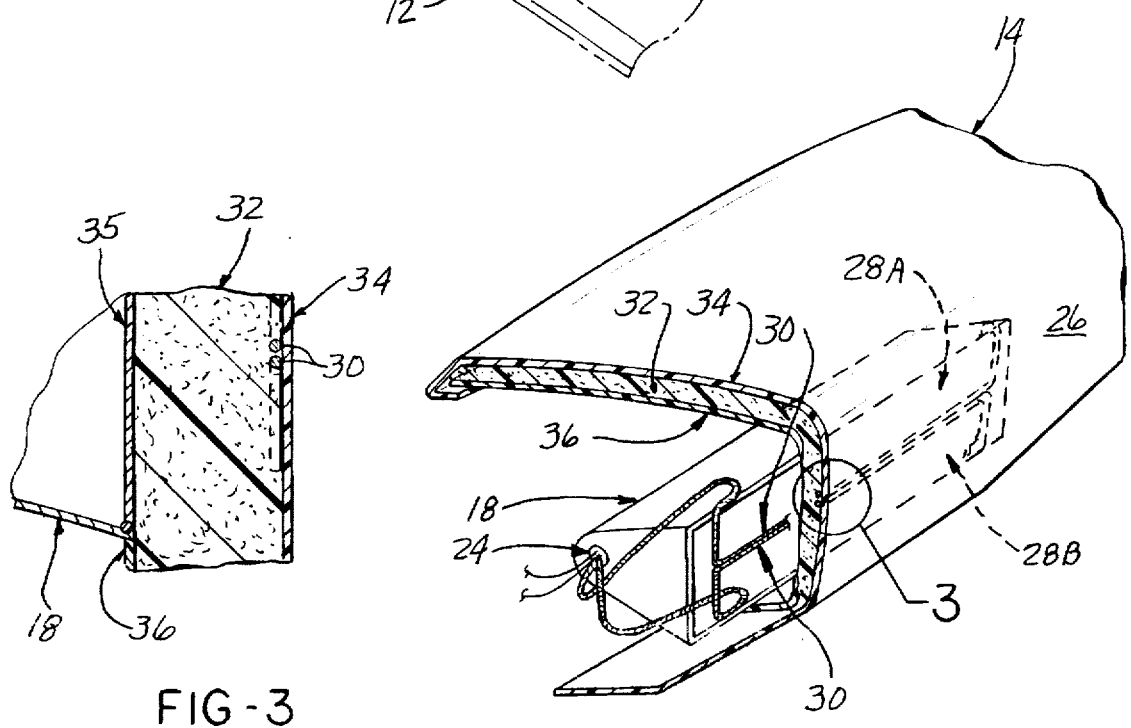
FIG-3
FIG-2

AUTOMOTIVE TRIM PIECE AND METHOD TO FORM AN AIR BAG OPENING

CROSS REFERENCE TO RELATED APPLICATIONS

This is a continuation of copending application Ser. No. 08/511,327, filed on Aug. 4, 1995 which is a divisional of U.S. Ser. No. 08/391,336 filed on Feb. 21, 1995, now abandoned; which is a division of U.S. Ser. No. 07/934,886 filed on Aug. 24, 1992, now U.S. Pat. No. 5,217,244; which is a continuation of U.S. Ser. No. 07/471,922 filed on Jan. 23, 1990, abandoned; which is a continuation-in-part of Ser. No. 07/380,156 filed on Jul. 14, 1989, now abandoned; which is a continuation in part of U.S. Ser. No. 07/303,132 filed on Jan. 30, 1989, now U.S. Pat. No. 5,080,393.

BACKGROUND OP THE INVENTION

This invention concerns auto safety systems and more particularly inflatable cushion devices commonly referred to as "air bags". In such devices, a fabric cushion (the air bag) is stored in a folded condition within a receptacle defining a storage space within the vehicle passenger compartment. Upon activation of a crash sensor detecting an imminent high velocity impact, the air bag is inflated with a chemically generated gas and deployed in a manner and position calculated to absorb the impact of the driver or passenger thrown forward as the vehicle is sharply decelerated at impact.

The folded air bag, gas generator, and other components of the system may be stored within a receptacle mounted in the steering wheel or behind the instrument panel forward of the passenger seat, covered by one or more doors which are opened by pressure generated by the inflating air bag.

The receptacle must be stored in a manner which is tamperproof, yet allowing instantaneous deployment of the air bag upon system activation. Further, the covering must resist normal pressure exerted thereon as by incidental contact with the vehicle occupants.

Prior art systems have typically involved exteriorly visible patterns on the surface instrument panel or steering wheel covers delineating the openings therein through which the air bag will be deployed.

The presence of the visible pattern reduces the aesthetic appeal of the interior trim surfaces and is disturbing to many persons as it makes the presence and possible pending deployment of the air bag obvious. This visible pattern also makes the systems more vulnerable to tampering because of its evident location.

The usual approach in designing a closure is to provide a hinged door latched by a detent mechanism or snap fitted portions forced apart by the pressure of the inflating air bag. See U.S. Pat. No. 4,327,937 issued on May 4, 1982 on a "Downwardly Foldable Covering For a Gas Cushion" for an example of such a covering.

Another common approach is to provide an exteriorly visible line of weakening in a covering skin which is ruptured by the air bag upon deployment. See for examples of such a design U.S. Pat. No. 4,400,010 issued on Aug. 23, 1983 for "Air Bags in Motor Vehicles", and U.S. Pat. No. 4,334,699 issued on Jun. 15, 1982 for "Cap Like Cover for an Air Bag Installation".

U.S. Pat. No. 3,640,546 issued on Feb. 8, 1972 for a "Safety Apparatus" discloses a preweakened covering skin over closure doors but the seam skin is unsupported along the seam, and thus the seam would be tactilely perceptible and also, over time, would also become visible due to the absence of any support underneath.

Another approach is described in U.S. Pat. No. 3,632,136 issued on Jan. 4, 1972 for a "Safety Apparatus", in which a powerful linear shaped explosive charge is used to sever a door lock and reinforcing panel to release a locked door just prior to deployment of the air bag to enable the door to be pushed open by the air bag.

In all of the above designs, the outline of the closure is suggested, and some also result in the showering of debris into the passenger compartment when the system is activated.

Most designs also use separately manufactured and installed covering doors, which increases the cost of manufacture of the air bag installation.

In copending U.S. patent application Ser. No. 07/303,132 filed on Jan. 30, 1989, now U.S. Pat. No. 5,080,393 there is disclosed an invisible closure utilizing a length of detonation cord to create an air bag deployment opening in an interior auto body panel to avoid any suggestion that an air bag is installed therein.

SUMMARY OF THE INVENTION

The present invention provides an invisible air bag installation by the preweakening of the covering layer or skin of a seamless expanse of a trim panel, by cutting a groove into the inside of covering layer in a pattern shaped so as to form a deployment opening immediately above an air bag receptacle mounted behind the trim panel.

The underlying substrate includes a separate door panel fit into an opening in the substrate, so that by preweakening the covering skin, the remaining portions of the trim panel adjacent the pattern are easily able to be pushed aside by inner door panels opened by the expanding air bag to enable deployment through the opening. A degrading of the skin is also carried out by the controlled application of energy.

This preweakening is accomplished by cutting a groove into the inside surface of the skin to a carefully controlled depth to provide for a consistent preweakening of the skin in a matching pattern to augment the effect of activation of the linear element.

DESCRIPTION OF THE DRAWINGS

FIG. 1 is a perspective fragmentary view in phantom of the forward position of an automobile illustrating air bag covering installations according to the present invention.

FIG. 2 is a transverse sectional view of a trim panel having an arrangement of linear thermal generators mounted embedded therein to enable an air bag deployment opening to be formed therein according to the present invention.

FIG. 3 is an enlarged fragmentary perspective view of the arrangement of a trim panel and thermal generator elements according to the present invention.

DETAILED DESCRIPTION

Figure 4:
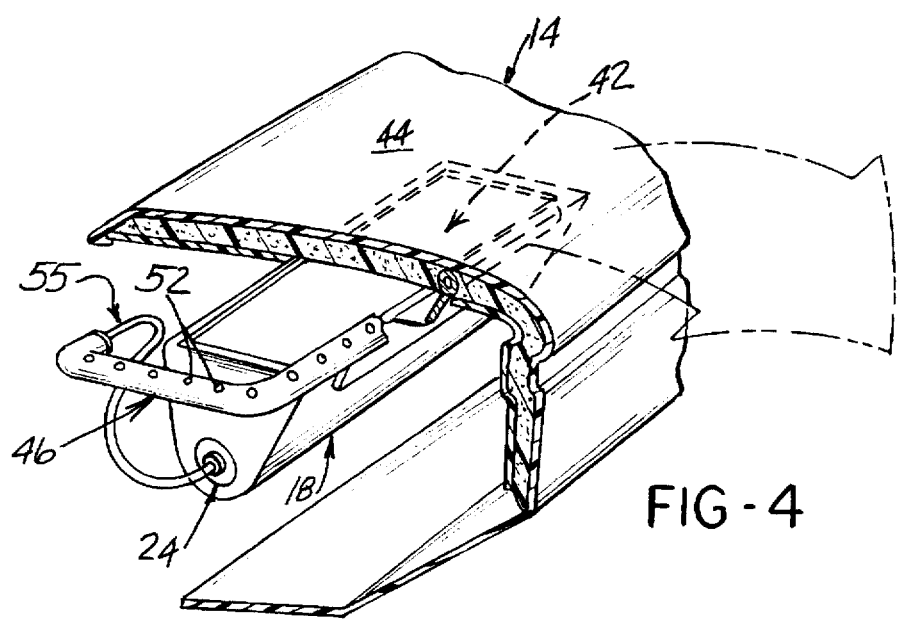
FIG. 4 is a fragmentary perspective view of an instrument panel having an alternate air bag deployment opening forming arrangement according to the present invention.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to FIG. 1, the major components of an air bag safety system are depicted installed in an automobile. The automobile body 10 has a passenger compartment 12, with various trim panels or pieces finishing the interior thereof.

The air bag system may include a passenger side air bag stored behind an instrument panel 14 and a driver side air bag stored beneath a steering wheel cover 16, the instrument panel 14 and steering wheel cover 16 each comprising such an interior trim panel or piece arrayed about the passenger compartment.

Each air bag installation includes a receptacle 18 containing a folded air bag, which is deployed into the passenger compartment by being inflated with a gas in the manner well known to those skilled in the art. A plurality of crash sensors 20 are arranged about the front of the vehicle which upon the occurrence of a severe collision, generate electrical signals received by a control unit 22, which in turn activates the gas generator contained within the receptacle 18.

Since such air bag systems are well known in the art, and the present invention is not concerned with the details thereof, a description of these details is not here set out.

Suffice it to say that the gas generators typically are activated by an ignitor assembly 24 which upon receiving an electrical signal, ignite a chemical charge to produce a high temperature reaction which in turn initiates the chemical reaction producing a large volume of nitrogen gas for inflation of the air bag.

As described above, the air bag must be stored ready for deployment until such collision occurs.

A deployment opening is formed by the controlled application of concentrated energy onto a smooth, uninterrupted expanse of a trim panel, wheel cover, or other piece behind which is mounted an air bag, at the instant of deployment of the air bag.

Such opening is almost instantly formed by the very rapid application to the covering skin therein of energy sufficient to form a line of separation in a pattern shaped to form three sides of a single covering outer door, or of a pair of covering outer doors, with the other side or sides bent by the force of the inflating air bag bent by the force of the inflating air bag to act as a hinge to open the door so formed.

The trim panel or piece is constructed so that the remaining portions thereof in the region above the air bag receptacle are sufficiently weakened to be easily severed by receptacle doors pushed open by the air bag itself.

A first embodiment of the energy application arrangement is illustrated in a so-called midmount installation, shown in FIGS. 1–3. A pair of such covering doors 28A and 28B are formed at the instant of system activation into a smooth expanse 26 of the instrument panel 14, hinged along opposite sides in moving to form a deployment opening.

In this first embodiment lengths of linear thermal generating elements 30 are embedded in the instrument panel 14 in the described double door pattern over the air bag receptacle 18. As shown in FIG. 3, the elements 30 are located just below the covering outer layer here comprised of a vinyl skin 34. The trim panel such as the instrument panel 14 is constructed to have sufficient structural integrity to enable assembly and to resist normal contract pressures. Such construction is typically provided by a stiff underlayer 36 of metal or rigid plastic overlain by a layer of soft foam 32 and covered by the skin 34.

According to the concept of the present invention, the underlayer 36 has an opening formed therein shaped to allow the air bag receptacle 18 to be received thereinto, leaving only the layer of foam 32 and the skin 34 above a hinged inner door or doors 35 covering the receptacle 18. Such inner doors 35 may alternatively be incorporated in the instrument panel 14. The receptacle 18 is mounted as by bracketing (not shown) to be supported beneath the instrument panel 14 in the position shown in FIG. 3.

The thermal generating elements 30 may comprise a material consisting of two diverse metallic elements in intimate contact with each other. When these elements are subjected to an initiating temperature, a very rapid alloying reaction occurs, in which a great amount of heat is released. Such material in thin wire or ribbon form, comprises an outer core of a palladium alloy and an inner core of aluminum alloy is commercially available under the trademark "PYROFUZE" (TM) from Pyrofuze Corp. of Mount Vernon, N.Y.

Preferably, several of these elements each of small diameter, i.e., 0.004 or 0.005 inches thick, are twisted together to generate sufficient heat while maintaining the very high speed reaction required.

This reaction is not explosive and results in a heat degradation of the vinyl skin 34 in the pattern of the element 30 sufficient to allow the inner doors 35 and deploying air bag to push out and separate the adjoining sections of the foam layer 32 thereof.

The elements 30 may be directly connected to the air bag ignitor assembly 24, thereby insuring coordinated activation simultaneously with the air bag deployment.

Figure 5:
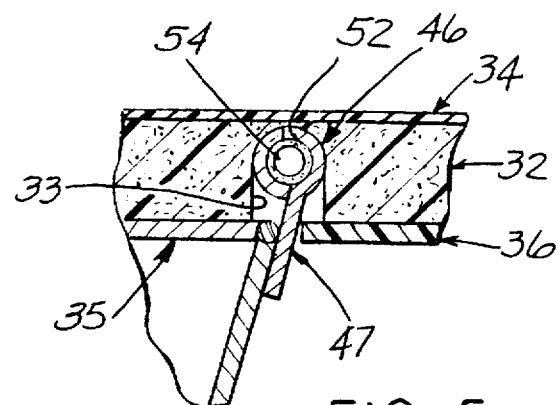
FIG. 5 is a transverse sectional view of the instrument panel and opening forming arrangement shown in FIG. 4.

An alternate embodiment is shown in FIGS. 4 and 5, illustrated applied to a "topmount" application in which a single outer door 42 is formed in a smooth expanse 44 of a horizontal surface of the instrument panel 14 to allow deployment of the air bag stored in the receptacle 18 directly beneath the door 42.

In this instance a length of tube 46 of the desired configuration is positioned within a slot 33 let into the foam core 32, firmly mounted by being secured to one side of the air bag receptacle 18 with tabs 47.

The tubing 46 has a series of holes 52 directed outwardly towards the skin 34. A length of detonating cord 54 is disposed within the tube 46 and detonated by transmission of shock via a connector tube 55 with the ignitor assembly 24 of the air bag system itself so as to be simultaneously discharged. The detonating cord 54 may be commercially available as low power "Primaline" (TM).

As a result, a series of gas pressure jets are directed to perforate or otherwise degrade the skin 34 in the pattern outlining the door 42 so as to allow easy separation of the door 42 upon contact with the expanding air bag. The confinement of the detonating cord 54 within the tube 46 attenuates the intensity of the blast and eliminates the directing of any debris into the passenger compartment.

Figure 6:
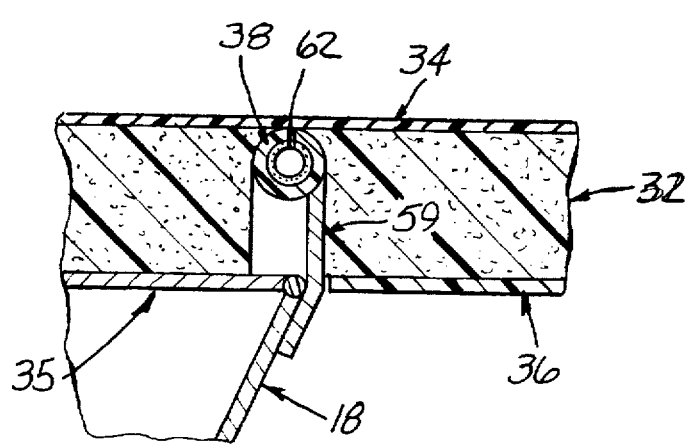
FIG. 6 is a transverse sectional view through an instrument panel and yet another embodiment of an opening forming arrangement according to the present invention.
Figure 7:
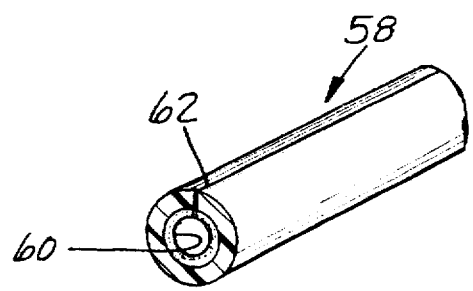
FIG. 7 is a perspective view of the shock tube element incorporated in the opening forming arrangement shown in FIG. 6.

Yet another embodiment is shown in FIGS. 6 and 7, in which a split sleeve type linear element 58 is embedded in the foam core 32 lying beneath the skin 34, arranged in a pattern corresponding to the door to be formed. The element 58 is secured to the receptacle 18 with formed tabs 59. A thin layer of explosive 60 coats the inside of a plastic tube 61. When detonated, a flame front propagates extremely rapidly along the slit 62, which is forced open by the pressure generated by detonation.

This flame front very effectively slices through the skin 34 to form the door through the unmarked expanse of instrument panel 14.

Such material is available under the trademark "NONEL" from the Ensign-Bickford Company of Simsbury, Conn.

The invention provides a strong tamper proof covering of the air bag receptacle which is invisible to the vehicle occupants, yet instantly provides an opening for proper deployment of the air bag upon activation of the system. By integrating the covering doors into the trim piece itself, the overall cost of manufacture is reduced and the system is simplified.

The arrangement according to the present invention while illustrated for passenger side air bag installations may also be employed for driver side air bags, by similar design of the steering wheel cover 16.

Figure 8:
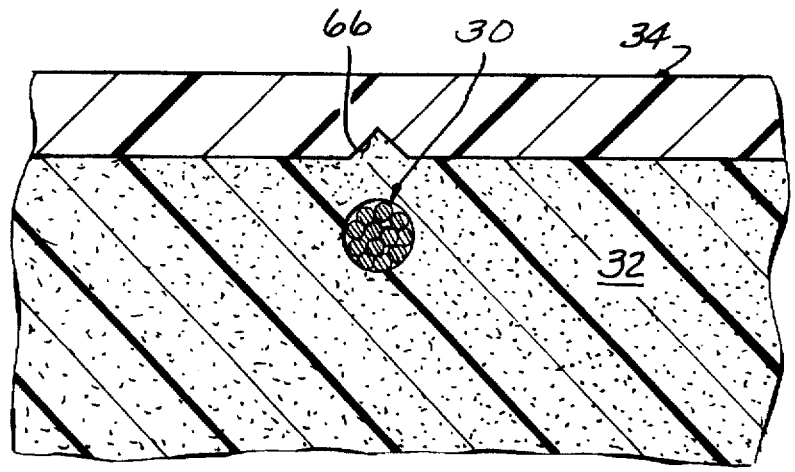
FIG. 8 is a fragmentary enlarged sectional view of the outer region of a trim panel in which a preweakening of the skin is achieved with a groove cut into the inside face.

The above described arrangements may also be combined with a mechanical preweakening of the outer layer covering skin 34, as depicted in FIG. 8.

This preweakening must be able to be accomplished to a uniformly consistent level in production.

According to this aspect of the concept of the present invention, this preweakening is achieved by cutting into the skin 34 along the inside surface thereof to form a groove 66 of a consistently controlled depth, and extending in the pattern of the opening to be formed. The groove 66 thus lies above the linear element.

Figure 9:
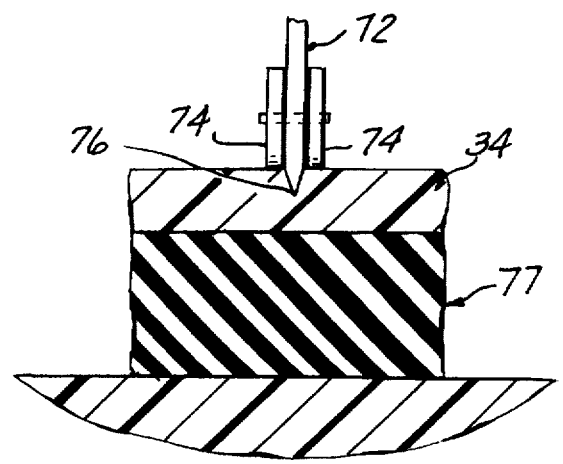
FIG. 9 is a sectional fragmentary view of a portion of skin having the groove being cut therein.

As noted, it is critical that the partial cutting of the inside of the skin 34 be consistently held to the designed for depth. FIG. 9 illustrates how this can be effectively done. A suitable cutting blade 72 has mounted to it guide elements 74 such as rollers adapted to rest on the surface of the skin 34 as the blade 72 traverses the skin 34. The distance below the surface of the skin 34 that the cutting edge 76 protrudes corresponds to the depth of cut, and should be set accordingly.

According to one aspect of this method, substantial compression of the skin material below the cutting edge 76 should be avoided in order to achieve a consistent depth. This requirement may be met by placing the skin 34 on a bed of a more easily compressed material than that of the skin, i.e., for example a layer of neoprene rubber 77 may be placed beneath a vinyl skin. This allows a slight deflection of the vinyl skin away from the cutting edge 76 to relieve excessive compression leading to erratic and inconsistent results.

Figure 10:
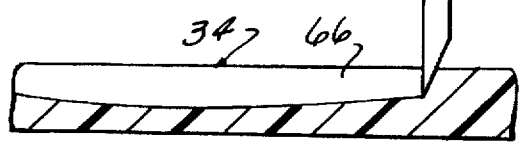
FIG. 10 is a sectional view of a portion of skin being formed with a preweakening cut, with a diagrammatic representation of a cutting device.

The partial cutting of the inside of the skin 34 can also be varied across the width of the disclosure, from a maximum depth at the center to a reduced depth at either side as shown in FIG. 10. This can be done by varying the depth of the cut 66, as by a cam control 78 or other arrangement. This configuration can insure beginning of the tear at the center and propagation to either side.

Thus, the activation of the element 30 can partially further degrade the skin 34 (and foam 32) in the pattern, with the force of the deploying air bag then mechanically severing the skin 34 along the preweakening groove 66. The reliably severed, combined effect can provide an exteriorly invisible seam forming the air bag deployment opening.

I claim:

1. A method of forming an air bag deployment opening within an expanse of a plastic covering layer of an interior trim piece extending within a passenger compartment of a vehicle, said deployment opening occupying a limited area of said expanse at a particular location within said covering layer expanse, said covering layer overlying a folded air bag stored behind said interior trim piece at said particular location, said covering layer smoothly and uninterruptedly overlying said particular location and adjacent regions of said interior trim piece, the method comprising the steps of preweakening the covering layer after the covering layer is first formed by cutting a groove extending partially into the inside of the covering layer in a deployment opening pattern, said deployment opening pattern occupying a limited area within said trim piece covering layer expanse; and molding a supporting layer of foam against the inside of said covering layer including a region lying beneath said groove cut into the inside of said covering layer, whereby inflation of the air bag causes severing of the covering layer along the groove to form a deployment opening in said covering layer at said particular location within a greater expanse of said plastic covering layer.

2. The method according to claim 1 wherein said cutting step comprises the step of partially slitting a flat sheet of material which forms said preweakening pattern.

3. The method according to claim 1 further including the step of degrading said covering layer at the time of air bag deployment by the application of energy in a pattern at least approximating said preweakening pattern.

4. An instrument panel for the interior of an automobile passenger compartment equipped with an inflatable air bag device adapted to be deployed into a passenger space in said passenger compartment, said air bag device mounted at a particular location behind said instrument panel to normally be concealed from view from within said passenger space, said instrument panel comprising a structure fixed within said passenger space and including a covering having an outer surface exposed to view extending smoothly and uninterruptedly across said location of said air bag device so as to not provide an external indication of said air bag device location;

said instrument panel also including a supporting structure underlying said covering and providing continuous support beneath said covering extending across the boundary between the region of said air bag device location and the remaining area of said covering, said supporting structure including a substrate panel having a deployment opening formed therein;

a door panel fit into said substrate panel opening, said door panel hinged to move away from surrounding adjacent portions of said substrate panel when said air bag is deployed enabling said deploying air bag to pass through said opening in said substrate panel; and, weakening means located beneath the outer surface of said covering for weakening said instrument panel and extending in a deployment opening pattern lying over said deployment opening in said substrate panel, said deployment opening pattern lying within a limited area of said covering and disposed at said particular location of said air bag device, which deployment opening pattern is not visible from within said passenger space prior to activation of said air bag device, whereby said location of said air bag device behind said instrument panel is not visible from within said passenger space until air bag device activation occurs.

5. The instrument panel according to claim 4, wherein said weakening means includes a linear energy element extending in said pattern and adapted to degrade said covering when said air bag device is activated.

6. The instrument panel according to claim 4, wherein said weakening means includes a groove cut into an inside surface of a skin defining said covering, said groove extending corresponding to said deployment door pattern.

7. The instrument panel according to claim 6 wherein said supporting layer includes a continuous foamed plastic layer disposed immediately beneath said skin covering to provide said continuous support.

8. The instrument panel according to claim 6 wherein said instrument panel supporting structure includes a rigid deployment door panel and a main rigid substrate panel underlying said foam layer and having an opening formed therein, said deployment door panel fit into said opening.

* * * * *

UNITED STATES PATENT AND TRADEMARK OFFICE
CERTIFICATE OF CORRECTION

PATENT NO.   : 5,797,619
DATED        : August 25, 1998
INVENTOR(S)  : David J. Bauer It is certified that error appears in the above-indentified patent and that said Letters Patent is hereby corrected as shown below:

Column 6, line 34, delete "said preweakening pattern" and insert therefor -- said covering layer of said trim piece--.

Signed and Sealed this

Thirtieth Day of March, 1999

Attest:

Q. TODD DICKINSON

*Attesting Officer*        Acting Commissioner of Patents and Trademarks